US011713811B2

(12) United States Patent
Machliner et al.

(10) Patent No.: US 11,713,811 B2
(45) Date of Patent: Aug. 1, 2023

(54) MULTI-PIECE OIL SCRAPER RING WITH REDUCED FRICTION

(71) Applicant: FEDERAL-MOGUL BURSCHEID GMBH, Burscheid (DE)

(72) Inventors: Stephan Machliner, Leverkusen (DE); Sina Shahverdi, Cologne (DE); Dirk Bärenreuter, Odenthal (DE)

(73) Assignee: Federal-Mogul Burscheid GmbH, Burscheid (DE)

( * ) Notice: Subject to any disclaimer, the term of this patent is extended or adjusted under 35 U.S.C. 154(b) by 0 days.

(21) Appl. No.: 17/260,794

(22) PCT Filed: May 28, 2019

(86) PCT No.: PCT/EP2019/063741
§ 371 (c)(1),
(2) Date: Jan. 15, 2021

(87) PCT Pub. No.: WO2020/015897
PCT Pub. Date: Jan. 23, 2020

(65) Prior Publication Data
US 2021/0270368 A1    Sep. 2, 2021

(30) Foreign Application Priority Data

Jul. 17, 2018   (DE) .................... 10 2018 117 198.6

(51) Int. Cl.
*F16J 9/06*    (2006.01)
(52) U.S. Cl.
CPC .............. *F16J 9/06* (2013.01); *F16J 9/067* (2013.01); *F16J 9/068* (2013.01); *F16J 9/069* (2013.01)

(58) Field of Classification Search
CPC ...... F16J 9/06; F16J 9/064; F16J 9/066; F16J 9/067; F16J 9/068; F16J 9/069; F16J 9/14; F16J 9/20; F16J 9/203
See application file for complete search history.

(56) References Cited

U.S. PATENT DOCUMENTS 2,554,069 A  *  5/1951  Stanley  ...................... F16J 9/06
                                                   277/456
2,656,230 A     10/1953  Phillips
(Continued)

FOREIGN PATENT DOCUMENTS

DE        1232419      *   1/1967
DE        1232419  B       1/1967
(Continued)

OTHER PUBLICATIONS

Quality Engine and Transmission Parts, Piston Rings, https://enginefixuk.com/engine-products/piston-rings/, Apr. 14, 2022, pp. 1-10.
(Continued)

*Primary Examiner* — Nicholas L Foster
(74) *Attorney, Agent, or Firm* — Dickinson Wright PLLC (57) ABSTRACT

A multi-piece piston ring includes an upper scraper ring 10 comprising two flank surfaces, an outer scraping surface/edge, and an inner spring contact surface. A lower support ring 4 includes two flank surfaces, an outer spring contact surface, and a support ring inner surface. An expander spring/spiral spring 8, which, on an upper and lower side, is operational to abut against a respective lower flank surface of the upper scraper ring 10 and against the upper flank surface of the support ring 4. Scraper ring contact projections protruding upwards on an inner spring side, and support ring contact projections protruding downwards on an outer spring side, wherein the scraper ring contact projections are to each abut against the inner spring contact
(Continued)

surface of the scraper ring 10, and support ring contact projections protruding downwards are to abut against the outer spring contact surface.

6 Claims, 6 Drawing Sheets

(56) References Cited

U.S. PATENT DOCUMENTS

| | | | | |
|---|---|---|---|---|
| 2,800,377 | A * | 7/1957 | Anderson | F16J 9/066 277/478 |
| 3,024,029 | A * | 3/1962 | Brenneke | F16J 9/063 267/1.5 |
| 3,261,612 | A | 7/1966 | Sames | |
| 3,370,858 | A * | 2/1968 | Braendel | F16J 9/063 277/444 |
| 3,814,444 | A * | 6/1974 | Johnson | F16J 9/068 277/480 |
| 3,893,675 | A * | 7/1975 | Geffroy | F16J 9/20 277/491 |
| 3,929,342 | A | 12/1975 | Morsbach et al. | |
| 4,145,060 | A | 3/1979 | Stecher et al. | |
| 4,629,198 | A * | 12/1986 | Morsbach | F16J 9/066 267/1.5 |
| 4,979,757 | A * | 12/1990 | Mizuno | F16J 9/068 277/443 |
| 5,039,116 | A * | 8/1991 | Maeda | F16J 9/206 277/467 |
| 5,564,699 | A * | 10/1996 | Lawrence | F16J 9/145 277/497 |
| 5,603,512 | A * | 2/1997 | Lawrence | F16J 9/203 277/497 |
| 11,092,238 | B2 * | 8/2021 | Machliner | F16J 9/20 |
| 2006/0049583 | A1 * | 3/2006 | Lu | F16J 9/068 277/434 |
| 2009/0013866 | A1 * | 1/2009 | Kariya | F16J 9/068 92/172 |
| 2014/0251254 | A1 * | 9/2014 | Franz | F02F 11/002 123/193.6 |
| 2015/0184748 | A1 * | 7/2015 | Sytsma | F16J 9/064 277/436 |
| 2019/0113139 | A1 * | 4/2019 | Machliner | F16J 9/203 |
| 2019/0219168 | A1 * | 7/2019 | Ruch | F16J 9/06 |

FOREIGN PATENT DOCUMENTS

| | | | |
|---|---|---|---|
| JP | 04-56971 | H | 4/1992 |
| JP | H0456971 | * | 5/1992 |
| JP | H0456971 | U | 5/1992 |
| JP | 09264426 | H | 1/2006 |

OTHER PUBLICATIONS

Kolbenringexpandertypen VF MF und SS50, Multi-Piece Oil Control Rings, Three-Piece Oil Control Rings, https://enginefixuk.com/engine-products/piston-rings/.

* cited by examiner

MULTI-PIECE OIL SCRAPER RING WITH REDUCED FRICTION

BACKGROUND

1. Technical Field

The present invention relates to a three-piece oil scraper piston ring with reduced friction in comparison with conventional piston rings.

2. Related Art

Conventional oil scraper piston rings or oil scraper rings, respectively, or oil rings, respectively, usually comprise one ring comprising two oil scraper rails, which are to remove excess oil from the inner cylinder surface of an internal combustion engine or which are to produce a defined oil film, which is as thin as possible, respectively.

There are different types of oil scraper rings, simple oil scraper rings usually comprise only one ring body comprising two scraper rails arranged on the outer surface. Further developed embodiments relate to oil scraper rings comprising an additional expander spring, which is to achieve a more uniform scraping effect along the entire circumference of the oil scraper ring.

In a further embodiment, so-called three-piece oil scraper rings are known, in the case of which two thin disc-shaped scraper rings are held in a piston ring groove by a common carrier, wherein the carrier often also assumes the function of an expander spring.

A three-piece oil scraper ring is known from U.S. Pat. No. 2,656,230 from 1953.

A three-piece oil scraper ring with a reduced friction is also known from the German patent application DE102016104853A1.

SUMMARY

It is desirable to reduce the friction in particular of internal combustion engines, in order to lower the consumption of fuel. It is the goal of the present invention to lower the friction loss of an internal combustion engine by reducing the friction, which is produced by a conventional three-piece oil scraper ring.

According to a first aspect, a multi-piece piston ring comprising an upper scraper ring, a lower support ring, as well as an expander spring/spiral spring is provided. The upper scraper ring has two flank surfaces, an outer scraping surface or edge, respectively, and an inner spring contact surface. The upper flank surface is to thereby abut against an upper piston ring groove flank, and the lower flank surface is to abut against the expander spring or spiral spring, respectively. The lower support ring has two flank surfaces, wherein an upper flank surface is to abut against the expander or spiral spring, respectively, and a lower flank surface is to abut against a lower piston ring groove flank. The support ring likewise has the outer spring contact surface, with which the support ring is to abut against the expander/spiral spring. In the case of this embodiment, the support ring inner surface ends on the inside upstream of a groove base of the piston ring groove.

On an upper side, the expander spring/spiral spring is to abut against the lower flank surface of the upper scraper ring. On a lower side, the expander spring/spiral spring is to abut against the respective upper flank surface of the lower support ring. On an inner spring side, the expander spring/spiral spring is provided with scraper ring contact projections, which protrude upwards and which abut against the inner spring contact surface of the scraper ring and which are to push the latter outwards against an inner cylinder wall. On an outer spring side, the expander spring/spiral spring is provided with support ring contact projections, which protrude downwards and which abut against the outer spring contact surface of the support ring and which are to push the spring radially outwards or support it radially inwards, respectively.

Here and hereinafter, "up" refers to the axial direction to the combustion chamber or piston bottom, respectively. Here and hereinafter, "down" refers to the axial direction to the crankcase or to the piston bolt, respectively. Here and hereinafter, "inside" refers to the radial direction to the piston axis or to the axis of symmetry, respectively, of the cylinder, or the direction to a piston ring groove base, respectively. Here and hereinafter, "outside" refers to the radial direction to the inner cylinder surface.

In this configuration, the support ring supports the expander spring/spiral spring inwards in the radial direction and upwards in the axial direction. In this configuration, the expander spring/spiral spring pushes the scraper ring outwards in the radial direction and upwards in the axial direction.

In an exemplary embodiment, the expander spring/spiral spring is embodied as MF spring. In contrast to the standard Mf springs, which have an essentially T-shaped cross section, it has a double L-shaped cross section, wherein the radial legs of the double L-shaped cross section coincide, and an axial leg of the double L-shaped cross section extends upwards on the inside, and an axial leg extends downwards on the outside.

In a further exemplary embodiment, the expander spring/spiral spring is embodied as VF spring. In contrast to conventional VF expander springs/spiral springs, however, it has a Z-shaped or S-shaped cross section, respectively. It is also possible, however, to use a U-shaped VF expander spring/spiral spring, in the case of which the support ring contact projections are embodied like the base or the serif of a lowercase "u", and are arranged on the outside on the bottom of the VF expander spring/spiral spring.

In the case of an additional exemplary embodiment, the expander spring/spiral spring is embodied as SS50 spring. SS-50 springs are essentially sheet metal strips, which are corrugated in the radial direction and which, at radially internal sections, have formations, which serve as contact projections. In the case of conventional SS-50 springs, the contact projections are arranged opposite one another, in the case of the alternative of the SS-50 spring according to the invention, in contrast, the contact projections are arranged offset to one another.

In the case of a further exemplary embodiment of the multi-piece piston ring, the lower support ring encompasses, at the joint ends, an engagement structure, which aligns the joint ends relative to one another in the axial direction and/or radial direction. In particular in the case of an unworn upper scraper ring, the expander spring/spiral spring can be compressed so strongly that the joint gap closes and both joint ends adjoin one another. While entering, a "joint biting" and an increased wear of the joint ends of the support ring could occur, when the joint ends can move against one another in the axial direction or radial direction. To prevent this, a type of groove/spring or gable/channel structure can be used, in order to prevent such a movement of the joint ends relative to one another.

In the case of an additional exemplary embodiment of the piston ring, the lower support ring is preloaded in such a way that the joint ends adjoin one another or are pushed against one another. In contrast to all other piston rings or piston ring parts, the support ring is completely closed in the case of this embodiment, and the gap is always 0. A defined support surface can thus be provided for the expander spring/spiral spring. A further advantage is that it is likewise possible to prevent that a radial inside of the support ring can come into contact with a piston ring groove base.

However, the largest advantage is that the support ring can be embodied to be significantly thinner or flatter, respectively, because it does not have to exert a spring force in order to push the expander spring/spiral spring outwards. In this embodiment, the forces can simply be exerted by the closed ring. A radius reduction would only be possible here when the ring would be deformed into a wave shape or a kidney shape.

It can be ruled out in the case of the above embodiment that the lower ring or the support ring, respectively, can come into contact with the cylinder wall. This embodiment allows a simple and light embodiment of a low-friction multi-piece oil scraper ring.

According to a further aspect, a multi-piece piston ring comprising an upper scraper ring, a lower spring support ring, as well as an expander spring/spiral spring is provided. The upper scraper ring has two flank surfaces, an outer scraping surface/edge, and an inner spring contact surface. The upper flank surface is to thereby abut against an upper piston ring groove flank, and the lower flank surface is to abut against the expander/spiral spring.

The lower spring support ring has an L-shaped cross section. One leg of the L-shaped cross section is guided outwards in the radial direction as radial leg and extends essentially parallel to the upper scraper ring.

One leg of the L-shaped cross section is embodied as axial leg and runs in the axial direction, wherein the axial leg is arranged on an inside of the spring support ring and extends upwards in the direction of the spring. An axial leg outside (viewed in the radial direction) thereby forms a spring contact surface.

The lower support ring or the radial leg, respectively, has two flank surfaces, wherein an upper radial leg flank surface is to abut against the expander/spiral spring, and a lower radial leg flank surface is to abut against a lower piston ring groove flank. At the axial leg, the spring support ring has an inner spring contact surface, with which the spring support ring or the axial leg, respectively, is to abut against the expander/spiral spring. In the case of this embodiment, the spring support ring inner surface ends upstream on the inside of a piston ring groove base.

The expander spring/spiral spring is to abut with an upper side against the lower flank surface of the upper scraper ring. On a lower side, the expander spring/spiral spring is to abut against the respective upper flank surface of the lower spring support ring. On an inner spring side, the expander spring/spiral spring is provided with scraper ring contact projections, which protrude upwards and which abut against the inner spring contact surface of the scraper ring and which are to push the latter outwards against an inner cylinder wall. On the outer spring side, the expander spring/spiral spring does not have any support ring contact projections, which protrude downwards, but requires only a lower inner region, which can abut against the outer spring contact surface of the spring support ring or the inner surface of the axial leg, respectively, and which can push the spring radially outwards or support it radially inwards, respectively.

In an exemplary embodiment, the expander spring/spiral spring is embodied as MF spring. In contrast to a conventional MF spring, it has only upper contact projections, wherein the lower side of the MF spring is embodied to be flat and without projections, because the axial leg of the spring support ring serves as contact surface. In contrast to the previous embodiment, the spring support ring is provided here with the contact projections or the contact projection, respectively. Here, the MF spring has only an essentially L-shaped cross section. Wherein an axial leg extends upwards on the inside of a radial leg in the enveloping of the MF spring.

In the case of another further exemplary embodiment, the expander spring/spiral spring is embodied as VF spring. In contrast to conventional VF expander springs/spiral springs, it does not have any radial contact projections, which extend in the axial direction, at the lower leg on the inside. The VF spring thereby abuts against the outside of the axial leg of the spring support ring, which extends in the axial direction, with the lower leg of a Z-shaped cross section or with the end leg of a U-shaped cross section.

In the case of an additional exemplary embodiment, the expander spring/spiral spring is embodied as SS50 spring. SS-50 springs are essentially sheet metal strips, which are corrugated in the radial direction and which, at radially internal sections, have formations, which serve as contact projections. In the case of conventional SS-50 springs, the contact projections are arranged opposite one another, in the case of the alternative of the SS-50 spring according to the invention, in contrast, the contact projections are arranged only on one, namely inside on the upper side. It is thus sufficient to remove the previous lower contact projections only on one side of a conventional SS-50 spring.

In the case of a further exemplary embodiment of the multi-piece piston ring, the lower spring support ring encompasses, at the joint ends, an engagement structure, which aligns the joint ends relative to one another in the axial direction and/or radial direction. In particular in the case of a non-closed upper scraper ring, the expander spring/spiral spring can be compressed so strongly that the joint gap closes and both joint ends adjoin one another. While entering, a "joint biting" and an increased wear of the joint ends of the support ring could occur, when the joint ends can move against one another in the axial direction or radial direction. To prevent this, a type of groove/spring or gable/channel structure can be used, in order to prevent such a movement of the joint ends relative to one another. The engagement structures can be arranged at the radial leg as well as at the axial leg here.

In the case of another exemplary embodiment, a radial engagement structure is provided at the radial leg, which aligns the joint ends of the spring support ring in the radial direction.

In the case of yet another exemplary embodiment, an axial engagement structure is provided at the axial leg, which aligns the joint ends relative to one another in the axial direction.

In the case of an additional exemplary embodiment of the piston ring, the lower spring support ring is preloaded such that the joint ends adjoin one another or are pushed against one another. In contrast to all other piston rings or piston ring parts, the support ring is completely closed in the case of this embodiment, and the gap is always 0. A defined support surface can thus be provided for the expander spring/spiral spring. A further advantage is that it is likewise possible to prevent that a radial inside of the support ring can come into contact with a piston ring groove base.

However, the largest advantage is that the support ring can be embodied to be significantly thinner or flatter, respectively, because it does not have to exert a spring force in order to push the expander spring/spiral spring outwards. In this embodiment, the forces can simply be exerted by the closed ring. A radius reduction would only be possible here when the ring would be deformed into a wave shape or a kidney shape.

It can be ruled out in the case of the above embodiment that the lower ring or the support ring, respectively, can come into contact with the cylinder wall. This embodiment allows a simple and light embodiment of a low-friction multi-piece oil scraper ring.

DRAWINGS

Further features and advantages of the present invention follow from the description below in conjunction with the drawings, in which identical reference numerals identify identical or similar parts. The drawings show several exemplary embodiments of the invention. In the figures, the present invention is illustrated using schematic diagrams, which are not true to scale and which are to mainly show the difference to conventional oil scraper rings.

DETAILED DESCRIPTION

Identical or similar reference numerals are used in the figures as well as in the description below, in order to refer to identical or similar elements or components.

Figure 1A:
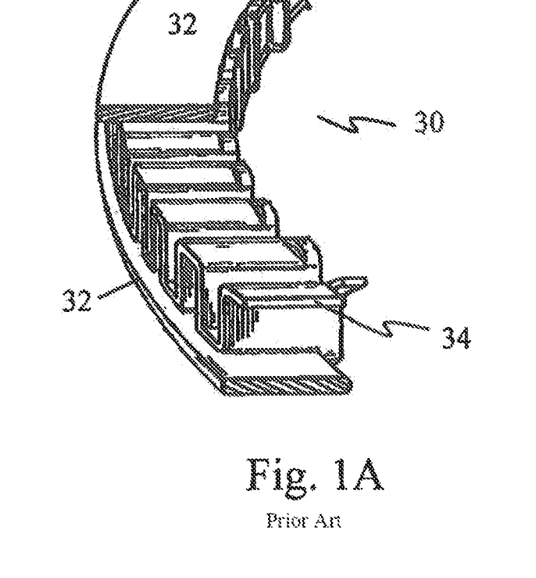
FIGS. 1A to 1C show various embodiments of conventional three-piece oil scraper rings.

FIG. 1 shows a conventional three-piece oil scraper ring 30 comprising an MF expander spring or MF spring corrugated in the axial direction, in a perspective partial view. The conventional three-piece oil scraper ring 30 comprises two scraper elements or scraper rings 32 and an expander/spacer, which is embodied as MF spring 34, which is made of an elastic, ductile metal strip, preferably a steel strip. The MF spring 34 ensures an axial distance between the two scraper rings 32 and pushes them outwards against an inner cylinder wall 50 to the same extent. The steel strip is corrugated and comprises several uniformly spaced waves in the axial direction. The bent points of the waves are provided with slots, wherein sections of the waves are flattened to attain support for the scraper rings 32 in the axial direction. Further, non-flattened sections of the bends, which protrude beyond the flattened wave peaks, form projections, which abut against insides of the scraper rings 32 and push them outwards in the direction of the inner cylinder wall 50. The projections additionally ensure that the MF spring 34 does not come into contact with the inner cylinder wall 50.

The wave shapes or straight sections, respectively, of the steel strip form a circumferential series of spring elements, which are under a compressive load when the three-piece oil scraper ring is inserted into the piston ring groove. As shown, the ends or projections, respectively, of the MF spring 32 in each case abut against the insides scraper rings 32 and in each case push them against the upper piston ring flank 16 or the lower piston ring flank 18, respectively. The flattened portions can be very uniformly shaped, and the magnitude of the radial force provided by the MF spring 34 can be set very precisely in this design.

Figure 1B:
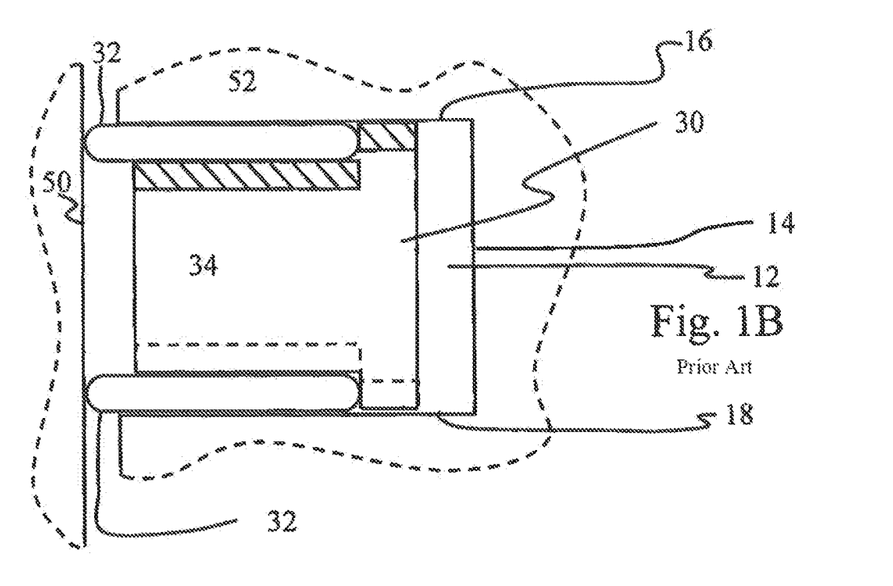

FIG. 1B shows a three-piece oil scraper ring 30 of FIG. 1A, used in a piston ring groove 12 in a sectional view. The illustration corresponds to FIG. 1A, wherein instead of both scraper rings 32 have an identical outer diameter/radius. The MF spring 32 is embodied as metal strip, which is corrugated in the axial direction and which comprises contact surfaces for both scraper rings 32. Projections, which protrude in the axial direction and which in each case abut against the upper and lower scraper ring 32 on the inside and push them outwards, are provided at the metal strip, which is corrugated in the axial direction. Both scraper rings 32 thereby come into contact with an inner cylinder wall 50 and are pushed against the inner cylinder wall 50. Both scraper rings 32 scrape oil from an inner cylinder wall 50 in this embodiment.

Figure 1C:
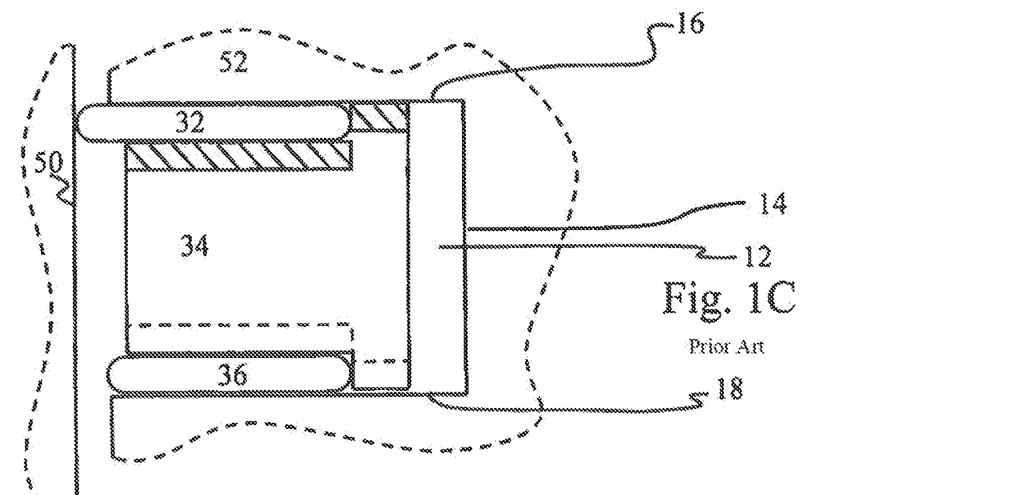

FIG. 1C shows a further three-piece oil scraper ring 30 with a reduced friction comprising an MF spring 34, which is corrugated in the axial direction, in a sectional view. The illustration corresponds essentially to FIG. 1B, wherein instead of the lower scraper ring, a stabilizing ring 36 is provided, the outer diameter/radius of which is smaller than that of the upper disc-shaped scraper ring 32. The MF spring is embodied as a metal strip, which is corrugated in the axial direction and which comprises contact surfaces for the scraper ring 32 and for the stabilizing ring 36. Projections, which protrude upwards and downwards in the axial direction and which in each case abut against the scraper ring 32 as well as against the stabilizing ring 36 on the inside and push them outwards, are provided at the metal strip, which is corrugated in the axial direction. Due to different outer diameters/radii of the scraper ring 32 and of the stabilizing ring 36, the scraper ring 32 protrudes further outwards than the stabilizing ring 32 by the radii difference between stabilizing ring 36 and scraper ring 32. Only the scraper ring 32 thus comes into contact with an inner cylinder wall 50 or at least only the scraper ring 32 is pushed against the inner cylinder wall 50 with considerable force. In this embodiment, only the scraper ring 32 scrapes oil from an inner cylinder wall 50, while the stabilizing ring 36 either has no contact at all with the inner cylinder surface 60 or is pushed by the MF spring against the inner cylinder surface 50 only so slightly that it cannot make a substantial contribution to scraping the oil.

Figure 2A:
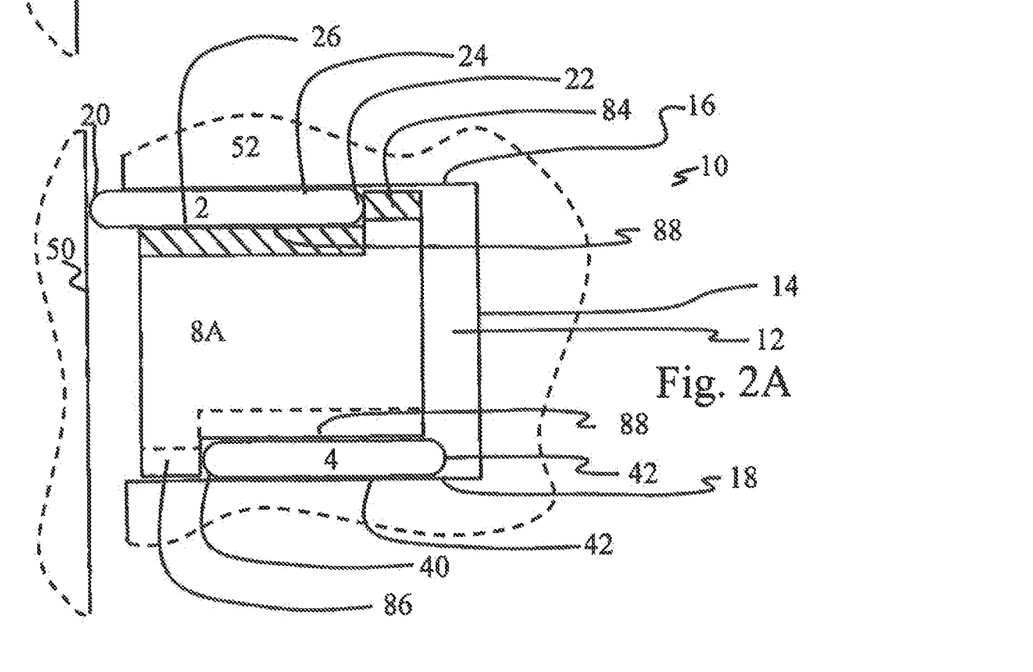
FIGS. 2A to 2C' show various embodiments of three-piece oil scraper rings according to the invention in sectional views according to a first aspect of the present invention.

FIG. 2A shows a sectional view through an oil scraper ring 10 according to the invention. FIG. 2A shows a three-piece oil scraper ring 10 according to the invention comprising an expander spring/spiral spring 8, which is corrugated in the axial direction and which is embodied as MF spring 8A. The three-piece oil scraper ring 10 according to the invention comprises an upper or combustion chamber-side scraper ring 2, respectively, a lower support ring 4, which are held by the MF spring 8A in the piston ring groove 12.

The MF spring 8A abuts with contact points 88 against the lower flank surface 26 of the upper scraper ring 2 and pushes the latter with the upper flank surface 24 of the upper scraper ring 2 against the upper piston ring groove flank 16 of the piston ring groove 12 in the piston 52. The MF spring 8A abuts with contact points 88 against the upper flank surface 44 of the lower support ring 4 and pushes the latter with the lower flank surface 46 of the lower support ring 4 against the lower piston ring groove flank 18 of the piston ring groove 12.

On the top and radially on the inside, the MF spring 8A has scraper ring contact projections 84, with which the MF spring 8A pushes from the inside against the inner spring contact surface 22 of the upper scraper ring 2 and pushes the latter with the outer scraping surface 20 against an inner cylinder surface 50.

On the bottom on the outside, the MF spring 8A has support ring contact projections 86, with which the MF spring 8A is supported radially to the inside against the outer spring contact surface 40 of the lower support ring 4. The lower support ring 4 is thereby pushed in the direction of the piston ring groove base 14. The lower support ring 4 can thereby either be preloaded like a conventional piston ring in the direction of a larger diameter. It is likewise possible, however, to use a support ring, which has a preloading, which is directed inwards. The piston ring is compressed by the spring. Depending on the prevailing force ratios, the joint ends of the support ring 4 can thereby be pushed against one another. The radial dimension of the support ring 4 is to thereby be selected in such a way that it, even when the joint ends touch or are pushed onto one another, the inner surface 42 of the support ring 4 cannot come into contact with the groove base 14 of the piston ring groove. It is ensured with this configuration that the piston ring can follow all movements of the piston in the cylinder, including tilting movements of the piston around the piston bolt axis.

In contrast to the conventional MF spring 34 of FIG. 1A to 1C, the MF spring of FIG. 2A does not have a T-shaped, but rather a double L-shaped design.

Figure 2B:
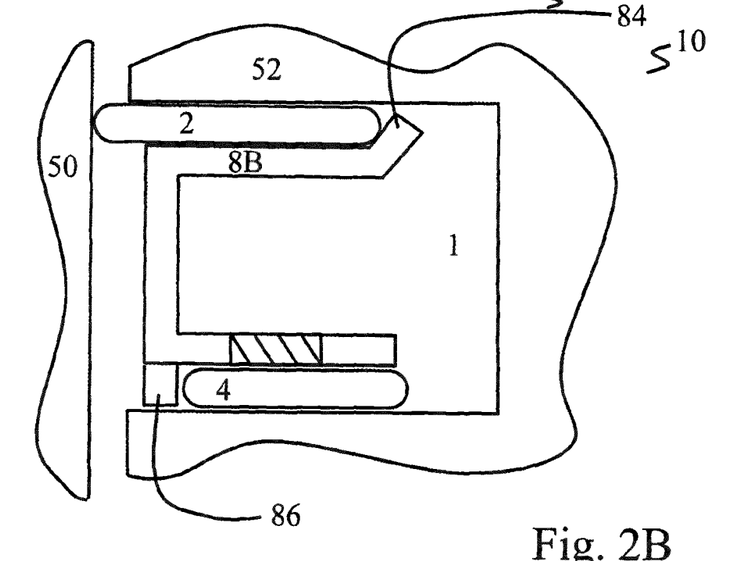

FIG. 2B shows a sectional view through an oil scraper ring according to the invention. In FIG. 2B, the oil scraper ring 10 shows essentially the same configuration of an upper scraper ring 2 and of a lower support ring 4. Wherein an expander spring/spiral spring pushes the upper scraper ring 2 outwards to the top and pushes the lower support ring 4 downwards to the inside. In FIG. 2B, the expander spring/spiral spring is not embodied as MF spring, but as so-called VF spring 8B. VF springs have a U-shaped cross section, wherein, at the ends of the legs of the U, sections are present, which are bent outwards and which are to each push against an upper or lower scraper ring, respectively, from the inside, and which are to push them against an inner cylinder wall 50. In the case of conventional VF springs, the U-shaped cross section opens radially to the inside in the direction of the ring axis. In the case of the present embodiment, the U-shape is modified into a u-shape, in that the lower leg ends in a straight manner, and the lower serif, which is typical for the lowercase u, is added. The lower serif thereby forms the support ring contact projections 86, which abut against the lower stabilizing ring 4 from the outside and which support the latter in the radial direction.

This embodiment requires only small changes to the VF spring 8B in comparison with conventional VF springs.

The VF spring 8B abuts against the lower flank surface of the upper scraper ring 2 and pushes the latter with its upper flank surface against the upper piston ring groove flank of the piston ring groove 12 in the piston 52. The VF spring 8B abuts with contact points on the upper flank surface of the lower support ring 4, and pushes the latter with its lower flank surface against the lower piston ring groove flank of the piston ring groove 12.

On the top and radially on the inside, the VF spring 8B has scraper ring contact projections 84, with which the VF spring 8B pushes from the inside against the inner spring contact surface of the upper scraper ring 2 and pushes the latter with the outer scraping surface against an inner cylinder surface 50.

On the bottom and radially on the outside, the VF spring 8B has support ring contact projections 86, with which the VF spring 8B pushes radially inwards against the outer spring contact surface of the lower support ring 4. The lower support ring 4 is thereby pushed radially in the direction of the piston ring groove base 14.

In contrast to a conventional VF spring, the MF spring of FIG. 2B does not have any inner lower radial contact surfaces 86, but is provided with the support ring contact projections 86. Instead of a U-shaped cross section, the VF spring has a u-shaped cross section, wherein the radial contact surfaces do not protrude downwards radially on the inside, but form radial contact surfaces 86, which protrude downwards radially on the outside.

FIG. 2B' shows a sectional view through a further embodiment of an oil scraper ring according to the invention. The only difference to FIG. 2B is that a different form of VF spring is used. The VF spring 8B' is embodied to have an essentially Z-shaped cross section, wherein the radial contact surfaces are arranged at the ends of the horizontal legs of the Z. Based on the usually U-shaped VF springs, only the angles between the legs, which run horizontally and vertically or transversely, respectively, are changed. The radial contact surfaces 84 and 86 can be bent in the same way as in the case of conventional VF springs. The forces, which the VF spring 8B' exerts on the scraper ring 2 or support ring 4, respectively, can be set by the dimensions of the components of the VF spring 8B'. It should be possible to derive the VF spring 8' of FIG. 2B' from a conventional VF spring more easily and with fewer changes.

Figure 2C:
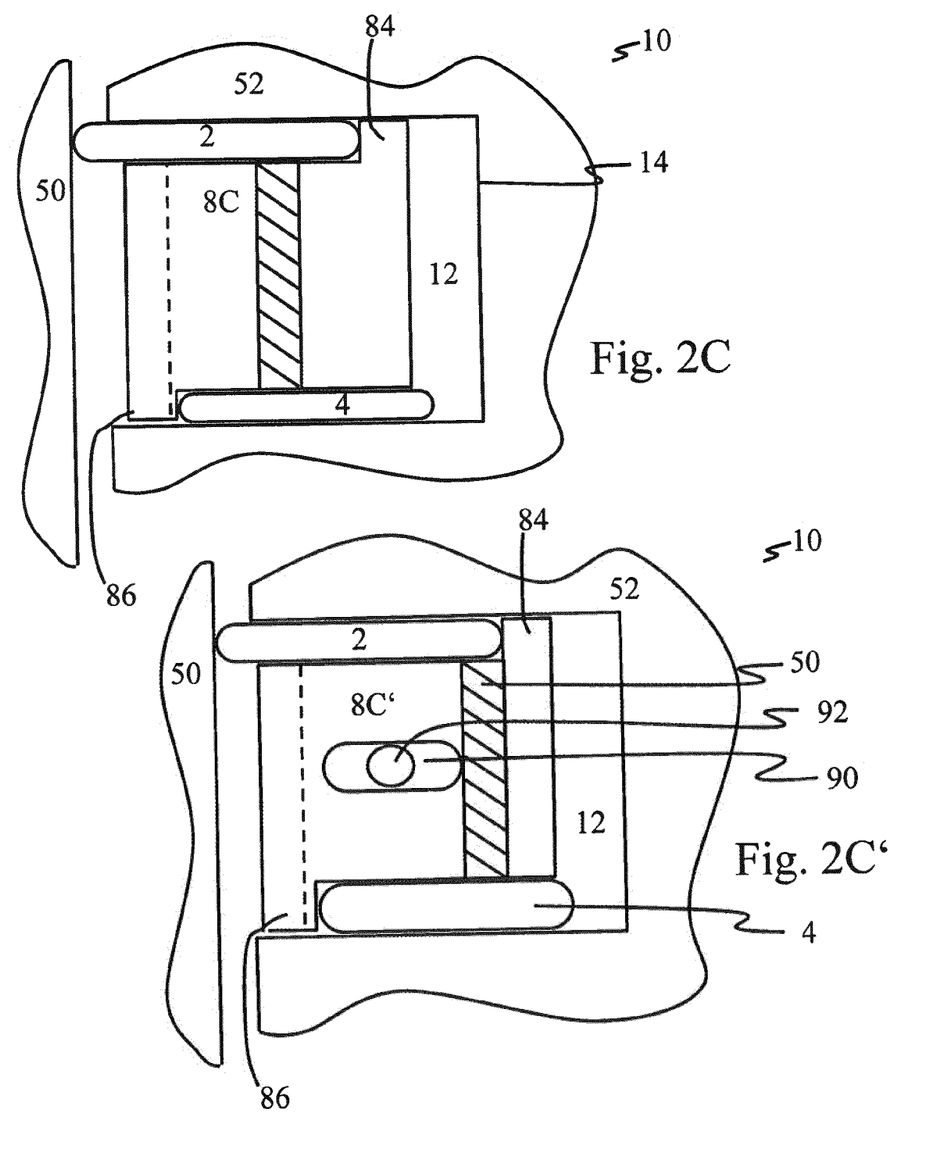

FIG. 2C shows a sectional view through an additional embodiment of an oil scraper ring according to the invention. In FIG. 2B, the oil scraper ring 10 shows essentially the same configuration of an upper scraper ring 2 and of a lower support ring 4 as in FIGS. 2A to 2B'. The expander spring/spiral spring pushes the upper scraper ring 2 outwards and to the top and pushes the lower support ring 4 downwards to the inside. In FIG. 2B, the expander spring/spiral spring is not embodied as MF spring or VF spring, but as so-called SS-50 spring 8C. SS-50 spring springs are bent/formed from a sheet metal strip, which runs parallel to the axial direction and which is corrugated in the radial direction. At the points with the smallest radial distance to the piston ring axis, the conventional SS-50 spring has projections, which protrude in the axial direction and which in each case abut against the conventional scraper rings on the inside and which are to push the latter outwards. This results in a sheet meal strip, which has oppositely arranged projections, the shape is reminiscent of the historical hook ladders, in the case of which the rungs start crosswise at a central bar member. In the case of the embodiment according to the invention, the left and right rungs are offset to one another, as in the case of modern "climbing trees", so that the inner ones can abut internally against the scraper ring in a conventional manner, while the outer ones abut externally against the support ring. The upper contact projections in each case push against an upper scraper ring from the inside and increase the pressure of the upper scraper ring 4 on the inner cylinder wall 50. The lower outer projections permit that the SS-50 spring is supported against the lower support ring 4 on the bottom.

This embodiment also requires only slight changes to the SS-50 spring 8C in comparison with conventional SS50 springs, because only the punching or cutting devices, respectively, which cut the SS-50 spring from a steel strip, have to be offset from one another. In the ideal case, it is sufficient to change one side of the punching device. The corrugated bending can thereby be performed with conventional machines for SS-50 springs.

FIG. 2C' shows a sectional view through a further embodiment of an oil scraper ring according to the invention. The only difference to FIG. 2C is that the SS-50 spring 8D is additionally provided with openings 90 in the circumferential direction, in which a circumferential stabilizing wire 92 is arranged. The stabilizing wire can simplify the assembly and can increase the stability of the oil scraper ring.

Figure 3A:
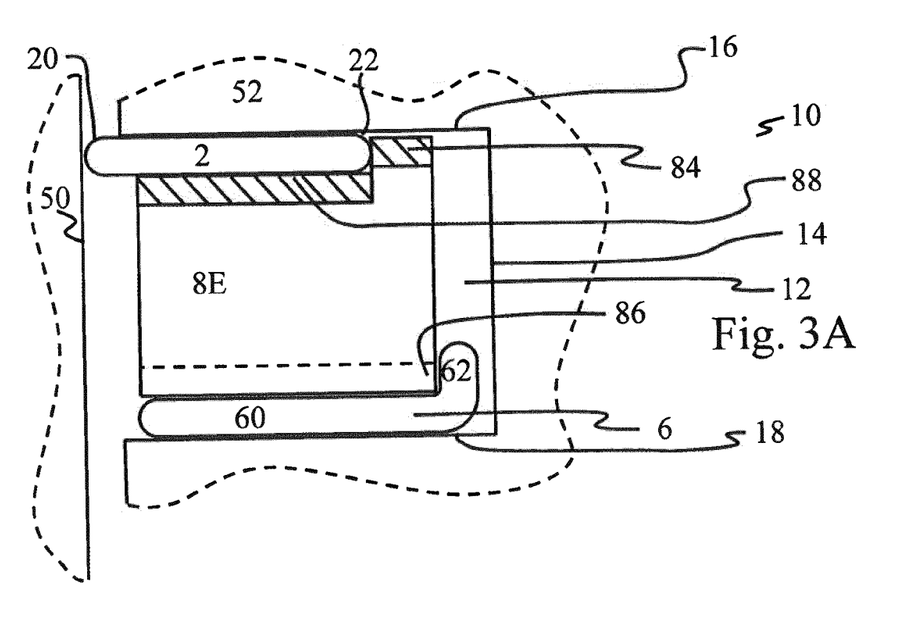
FIGS. 3A to 3C show various embodiments of three-piece oil scraper rings according to the invention in sectional views according to a further aspect of the present invention.

FIG. 3A shows a sectional view through an oil scraper ring 10 according to the invention. FIG. 3A shows a three-piece oil scraper ring 10 according to the invention comprising an expander spring/spiral spring 8, which is corrugated in the axial direction and which is embodied as MF spring 8E. The three-piece oil scraper ring 10 according to the invention comprises an upper or combustion chamber-side scraper ring 2, respectively, a lower spring support ring 6, which are held by the MF spring 8E in the piston ring groove 12.

The spring support ring 6 of FIG. 3A differs from the support ring 4 of FIG. 2A in that the spring support ring 6 has an L-shaped cross section, wherein the horizontal leg or the radial leg 60, respectively, of the lower spring support ring 6 serves as support surface for the MF spring 6D, while the axial leg 62 of the lower spring support ring 6 serves the purpose of providing a contact surface or a contact surface, respectively, for the lower inner edge or corner, respectively, of the MF spring 6D. With this embodiment, the lower contact projection at the MF spring, as it is shown in FIG. 2A, can be omitted. In this embodiment, the lower side of the MF spring 6E is simply only flat, and the lower spring support ring 6 can absorb the forces in the axial direction and radial direction. The upper side of the MF spring, in contrast, is embodied exactly as in FIG. 2A. In this embodiment, the MF spring can be produced significantly more easily, while only the cross sectional shape of the lower spring support ring 6 has to be changed from flat to L-shaped.

Figure 3B:
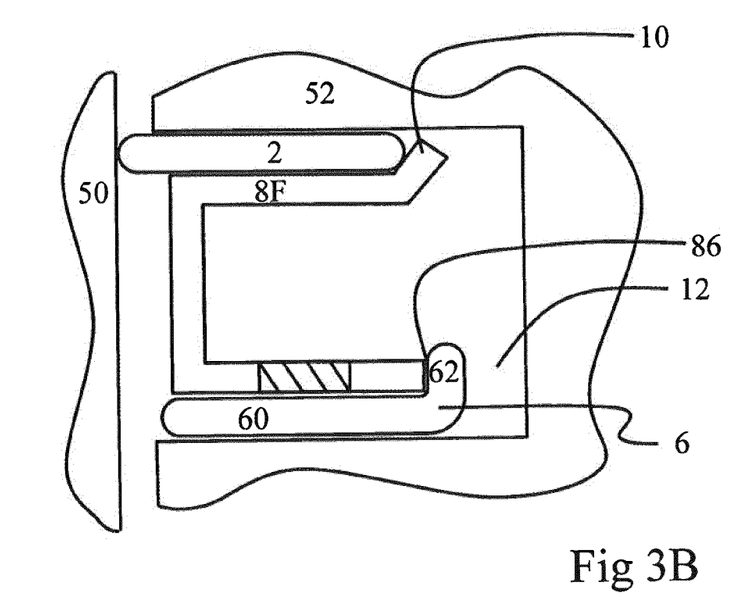

FIG. 3B shows a version of the oil scraper ring of FIG. 2B comprising the lower spring support ring 6 of FIG. 3A. The VF spring of FIG. 2B, in contrast, was adapted in such a way that the lower outer contact projections 86 were omitted, because the spring can support itself with its lower inner edge on the axial leg 62 of the lower spring support ring 6. The VF spring 8F of FIG. 3B can thus be produced even more easily.

Figure 3C:
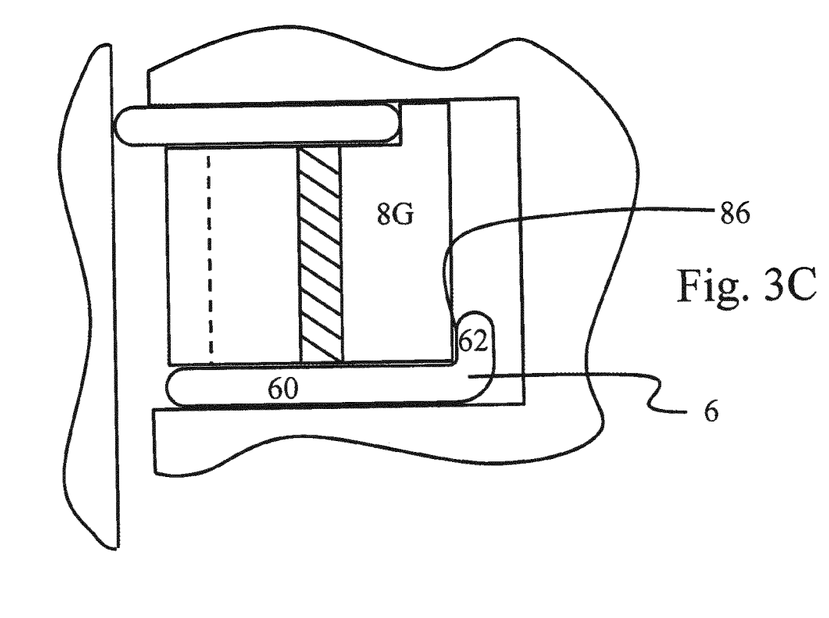

FIG. 3C shows a version of the oil scraper ring of FIG. 2C comprising the lower spring support ring 6 of FIG. 3A or 3B, respectively. The SS-50 spring of FIG. 2 was adapted in such a way that the lower outer contact projections 86 were omitted, because the spring can support itself with its lower inner edge on the axial leg 62 of the lower spring support ring 6. The SS-50 spring 8F of FIG. 3B can thus be produced even more easily. For this purpose, it is sufficient to simply remove the lower contact projections in the case of a classic SS-50 spring.

Obviously, many modifications and variations of the present invention are possible in light of the above teachings. It is, therefore, to be understood that the invention may be practiced otherwise than as specifically described while still being within the scope of the invention.

The invention claimed is:

1. A multi-piece piston ring, comprising:
an upper scraper ring having axially upper and lower flank surfaces, radially outer scraping surface and radially inner spring contact surface;
a lower support ring having axially upper and lower flank surfaces, radially outer spring contact surface and a radially inner support ring surface;
an expander spring having axially upper and lower sides thereof which, in use, are adapted to abut a respective lower one of the flank surfaces of the upper scraper ring and an upper one of the flank surfaces of the lower support ring, said expander ring comprising a steel strip spacer spring having a serpentine configuration with axial humps and including scraper ring contact projections of the expander spring protruding upwards on a radially inner spring side of the expander spring, and further including support ring contact projections protruding downwards on a radially outer spring side of the expander spring.

2. A multi-piece piston ring, comprising:
an upper scraper ring having axially upper and lower flank surfaces, radially outer scraping surface and radially inner spring contact surface;
a lower spring support ring having an axially upper flank surface;
an expander spring having axially upper and lower sides thereof which, in use, are adapted to abut a respective lower one of the flank surfaces of the upper scraper ring and the upper flank surface of the lower support ring;
wherein the lower spring support ring has an L-shaped cross-section with a radial leg thereof extending in a radial direction and parallel to the upper scraper ring and an axial leg thereof extending in an axial direction on an inside thereof toward the expander spring;
wherein, when viewed in the radial direction, an outer surface of the axial leg forms a spring contact surface;
wherein the expander spring includes scraper ring contact projections protruding upwards on an inner spring side, and including an edge provided on a bottom of the inner spring side which can abut against the axial leg of the lower spring support ring; and
wherein no portion of the expander spring extends below the axially upper flank surface of the lower spring support ring.

3. The multi-piece piston ring according to claim 2, wherein the expander spring comprises as steel strip having axial humps.

4. The multi-piece piston ring according to claim 2, wherein the expander comprises a strip bent to a U-shape with an open side of the U-shape facing toward an inside diameter of the expander ring.

5. The multi-piece piston ring according to claim 2, wherein the expander spring comprises a strip having humps extending an a radial direction of the expander spring.

6. A multi-piece piston ring, comprising:
an upper scraper ring having axially upper and lower flank surfaces, radially outer scraping surface and radially inner spring contact surface;
a lower spring support ring having an axially upper flank surface;
an expander spring having axially upper and lower sides thereof which, in use, are adapted to abut a respective lower one of the flank surfaces of the upper scraper ring and the upper flank surface of the lower support ring;
wherein the lower spring support ring has an L-shaped cross-section with a radial leg thereof extending in a radial direction and parallel to the upper scraper ring and an axial leg thereof extending in an axial direction on an inside thereof toward the expander spring;
wherein, when viewed in the radial direction, an outer surface of the axial leg forms a spring contact surface;
wherein the expander spring includes scraper ring contact projections protruding upwards on an inner spring side, and including an edge provided on a bottom of the inner spring side which can abut against the axial leg of the lower spring support ring; and wherein the expander comprises a strip bent to a U-shape with an open side of the U-shape facing toward an inside diameter of the expander ring.

* * * * *